Patented July 29, 1941

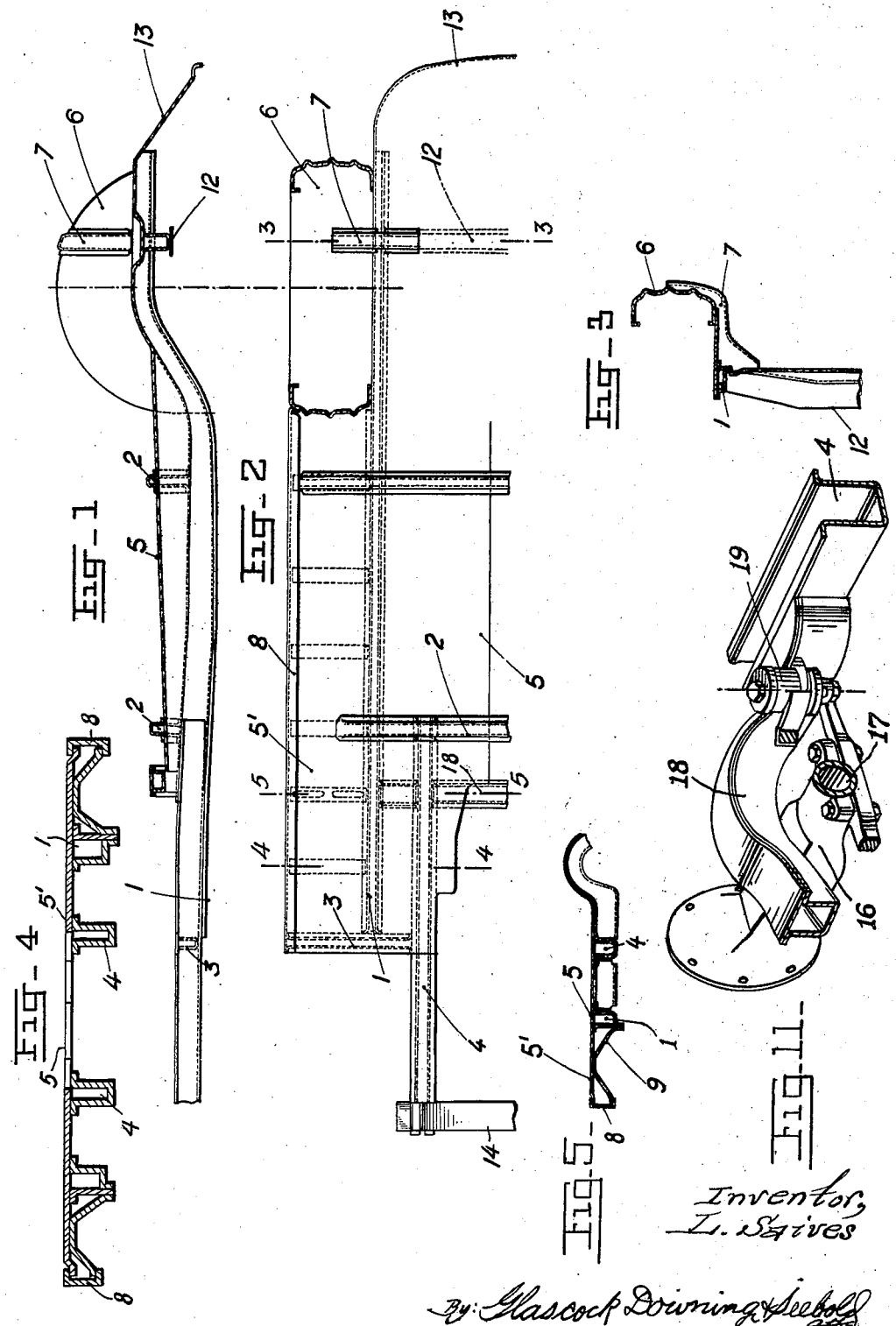

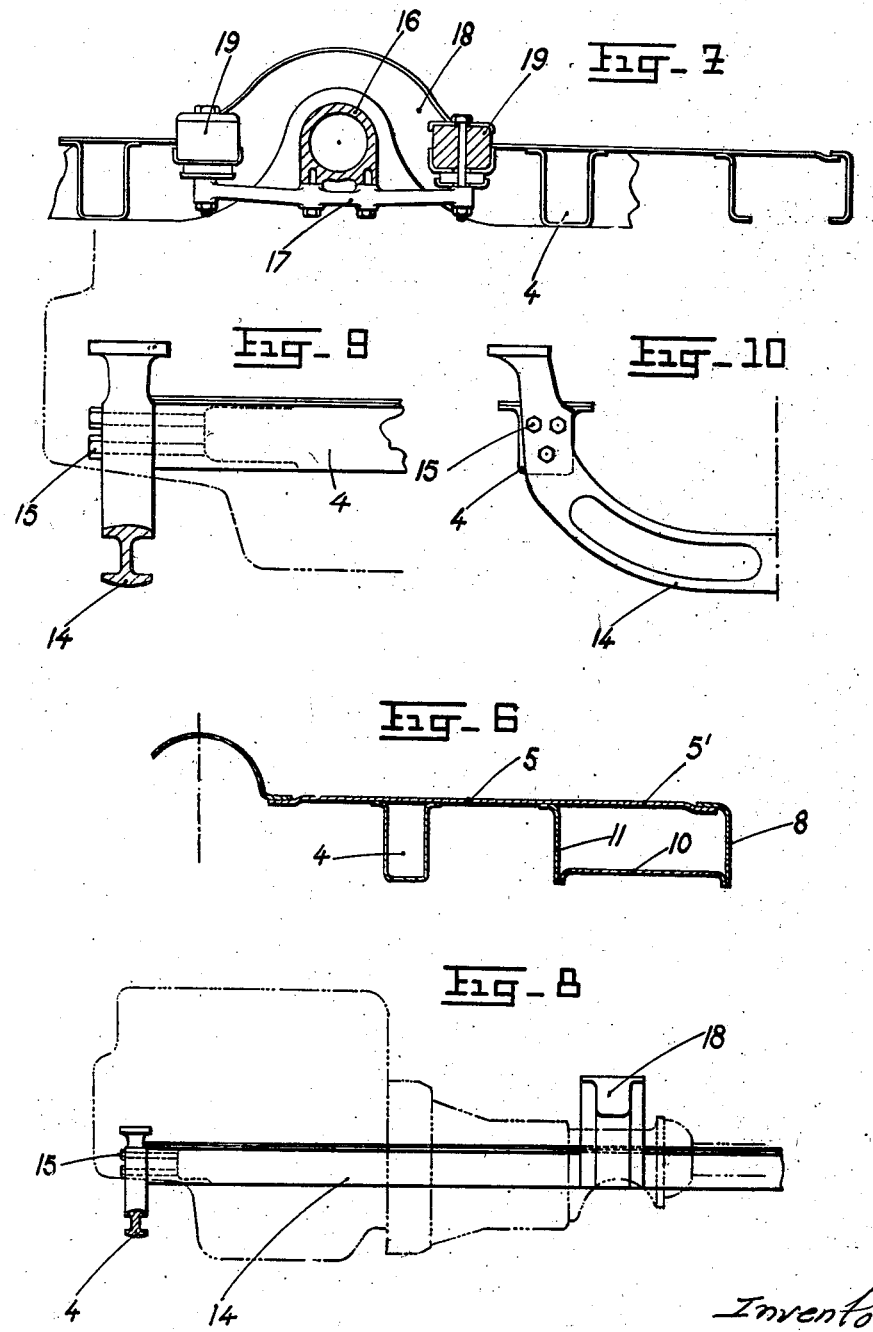

2,250,654

UNITED STATES PATENT OFFICE 2,250,654

VEHICLE FRAME

Léon Saives, Billancourt, France, assignor to Louis Renault, Billancourt, France Application March 13, 1939, Serial No. 261,669
In France May 27, 1938

2 Claims. (Cl. 280—106)

The present invention relates to frames for vehicles, and concerns improvements in these frames which are chiefly applicable to motor vehicles in order to increase their rigidity, while employing a simple method of construction by the use of frame side members.

In the accompanying drawings:

Fig. 1 is a side view of frame in conformity to the invention.

Fig. 2 is a plan view of the same.

Fig. 3 is a section on the line 3—3 of Fig. 2.

Fig. 4 is a section on the line 4—4 of Fig. 2.

Fig. 5 is a section of the frame on the line EF of Fig. 2.

Fig. 6 is a section analogous to Fig. 5, showing a modified construction.

Figs. 7, 8, 9 and 10 show the mounting of the engine upon the aforesaid frame.

Fig. 11 is a fragmentary perspective detail showing the means for connecting the engine to the front cross members.

With reference to the figures, it will be observed that the frame essentially consists of the principal straight side members 1, which extend upon the major part of the length of the vehicle. The said members are connected, by cross-pieces 2 and by section-bars 3, with a secondary frame consisting of small straight side members 4, which is narrower than the main frame and chiefly serves to support the engine, as will be further disclosed. The main frame is reinforced by a metal flooring 5 which is welded to the side members 1 and to the small side members 4, and also to the usual cross-pieces of the frame. At the rear, where the wheels are located, I place at the exterior of the side members, suitable ribbed concave members 6 which are adapted to surround the wheels and are secured to the side members 1 by welding and by means of bracing members 7, for instance according to the device, the subject-matter of my patent application Serial Number 254,478, filed February 3, 1939. By an examination of the sections shown in Figure 3 and 5, it will be observed that the flooring 5 is welded to the side members 1 and to the small side members 4, thus forming closed sections for these two parts. The flooring 5 extends outwardly of the small side members at $5^1$, and it is welded to a light section bar 8 which forms an external side member to which the motor-car body and the side guards are secured. The said bar 8 is secured to the cross-pieces of the frame and is welded to the concave member 6 at the rear. The part $5^1$ of the flooring is stiffened by the use of reinforcing members 9 having an inverted V shape, which are employed in suitable number and are welded to the flooring, to the members 8 and to the side members 1.

Fig. 6 shows a modified construction, in which the stiffening members 9 are replaced by a horizontal sheet-metal plate 10 and a section bar 11, which form, with the part $5^1$, a rigid box-shaped piece.

The side member 1 can be stopped at the rear somewhat beyond the cross-piece 12, and the two side members can be connected together by a sheet-metal plate 13 which is adapted to support the car body or may form part of the same. The concave members 6 are closed in the known manner, after the wheels have been mounted, by plates secured to the concave members by bolts and nuts, similar to what is employed for the removal of the wheels. It is feasible to increase the number of bolts spaced around the periphery of the concave member, in order to reinforce and to stiffen this latter.

The engine is mounted, as above stated, upon the small side members 4. The details of this mounting are shown in Figs. 7, 8, 9 and 10.

In the embodiment herein represented, the engine is mounted, in front, upon a U-shaped cross-piece 14 by means of suitable supports. The said cross-piece is secured to the small side members 4 at 15. The cross-piece 14, which can be readily removed, also supports the steering gear and the entire suspension in the case of independent suspension. At the rear, a portion 16 of the engine unit is mounted on a cross-piece 17 connected with a cross-piece 18 passing above the transmission, by means of rubber pieces 19, for instance. It will be noted that the engine, and if necessary the entire suspension together with the front wheels, may be removed from the frame, after taking off the cross-pieces 14 and 17, by sliding the same to the front or in allowing them to drop upon the ground. The engine unit alone may be dismounted, by releasing it from the cross-piece 14 and by dismounting its rear part, as above specified.

I claim:

1. In a vehicle frame including a pair of spaced parallel longitudinal side members forming a main frame, and a narrower auxiliary front frame secured to said main frame; means for supporting the engine of the vehicle comprising a cross member fixed to said auxiliary frame adjacent the rear of the latter, a removable cross piece, resilient means interposed between each end of said cross piece and said fixed cross member for supporting said cross piece on said fixed cross member, and a removable substantially U-shaped cross piece secured to said auxiliary frame adjacent the front thereof.

2. Apparatus as claimed in claim 1 wherein said resilient means comprises a block of rubber.

LÉON SAIVES.